United States Patent
Wabnig et al.

(10) Patent No.: US 9,840,036 B1
(45) Date of Patent: Dec. 12, 2017

(54) THERMOFORMING MACHINE, MOLD ASSEMBLY, MOLD, AND METHOD OF THERMOFORMING

(71) Applicant: KIEFEL GmbH, Freillasing (DE)

(72) Inventors: Erwin Wabnig, Siegsdorf (DE); Thomas Halletz, Waging am See (DE)

(73) Assignee: KIEFEL GMBH, Freillasing (DE)

( * ) Notice: Subject to any disclaimer, the term of this patent is extended or adjusted under 35 U.S.C. 154(b) by 0 days.

(21) Appl. No.: 15/594,097

(22) Filed: May 12, 2017

(30) Foreign Application Priority Data

Jul. 5, 2016 (NL) .................................. N2017101
Oct. 20, 2016 (DE) ....................... 10 2016 012 487
Nov. 14, 2016 (EP) .................................. 16002415

(51) Int. Cl.
 B29C 51/04 (2006.01)
 B29C 51/10 (2006.01)
 B29C 51/18 (2006.01)
 B29C 51/26 (2006.01)

(52) U.S. Cl.
 CPC .............. *B29C 51/18* (2013.01); *B29C 51/04* (2013.01); *B29C 51/10* (2013.01); *B29C 51/261* (2013.01); *B29C 51/264* (2013.01)

(58) Field of Classification Search
 CPC ......... B29C 51/04; B29C 51/10; B29C 51/18; B29C 51/26; B29C 51/261; B29C 51/428
 USPC ............................... 264/549, 550; 425/387.1
 See application file for complete search history.

(56) References Cited

U.S. PATENT DOCUMENTS

| 3,555,652 | A | * | 1/1971 | Ignell | ...................... B29C 51/04 156/500 |
| 3,964,856 | A | | 6/1976 | Day | |
| 4,265,852 | A | * | 5/1981 | Sauer | .................... B29C 43/146 264/512 |
| 4,563,325 | A | * | 1/1986 | Coffman | ................. B29C 51/08 264/153 |
| 7,655,179 | B2 | | 2/2010 | Iwasaki et al. | |
| 2005/0196567 | A1 | | 9/2005 | Iwasaki et al. | |
| 2008/0044603 | A1 | | 2/2008 | Hutchinson et al. | |

FOREIGN PATENT DOCUMENTS

| DE | 102007023301 A1 | 1/2008 |
| DE | 102007037748 B3 | 10/2008 |
| EP | 0734838 A1 | 10/1996 |
| EP | 1842651 A2 | 10/2007 |
| EP | 1854614 A1 | 11/2007 |
| EP | 2682250 A2 | 1/2014 |
| JP | 54066962 A * | 5/1979 |

* cited by examiner

Primary Examiner — Robert B Davis (74) Attorney, Agent, or Firm — Cantor Colburn LLP (57) ABSTRACT

A thermoforming machine and device are described. The thermoforming device relates to a mold assembly comprising a first and second mold, and to a mold that can be used in a thermoforming process. A method for thermoforming a product is also described. It is noted that the thermoforming device comprises a second pre-stretcher, in addition to a first pre-stretcher and a calibration element, and that the second pre-stretcher is at least partially and moveably arranged inside a second mold body. Movements of the first pre-stretcher, the second pre-stretcher, and the calibration element are configured to be individually controlled.

19 Claims, 6 Drawing Sheets

FIG. 5

THERMOFORMING MACHINE, MOLD ASSEMBLY, MOLD, AND METHOD OF THERMOFORMING

TECHNICAL FIELD

The present invention relates to a thermoforming machine. It further relates to a mold assembly and a mold that can be used in a thermoforming machine. It also relates to a method of thermoforming a product.

BACKGROUND

Thermoforming is a known technique by which a heated plastic foil can be shaped using a mold assembly. Generally, the mold assembly comprises two molds that can be moved relative to each other for clamping the heated plastic foil. At least one of these molds is provided with one or more forming cavities. The other mold is provided, for each forming cavity, with a pre-stretcher that can be moved into the forming cavity thereby stretching the plastic foil. Thereafter, an overpressure will be generated on one side of the plastic foil to force the plastic foil against the wall of the forming cavity. There, the plastic foil cools down and the shape of the product is defined.

For some applications, wall thickness of the final product, both in terms of size and variation among different products, is an important parameter. For instance, the thermoformed product may be required to cooperate with another product or device, wherein the latter product or device imposes size restraints on the thermoformed product. Typically, the size restraints only apply to certain parts of the product. As an example, a particular region of the bottom wall of the product may need to have a thickness within a predefined range.

DE 10 2007 023 301 A1 presents a solution to address this problem. In this known system, an upper mold of the mold assembly of the thermoforming apparatus is provided with a calibration element in the form of a pen that is either fixedly attached to the upper mold or it is moveably attached thereto. In this known system, the pen is partially arranged in the pre-stretcher. During operation, the pen is moved downward to engage the plastic foil before pre-stretching the plastic foil using the pre-stretcher. By clamping the plastic foil in between the pen and a wall of the forming cavity, it becomes possible to accurately define the wall thickness of the product at the position where the plastic foil is clamped.

There is a continuing demand for increasing the throughput of thermoforming apparatuses while at the same time allowing smaller variations in product geometry. The applicant has found that although the abovementioned known system provides a solution for products having a particular geometry, it may still show wall thickness variations for some product geometries that may be unacceptable for some applications.

SUMMARY

It is an object of the present invention to provide a solution for the above-described problem.

According to the invention, this object has been achieved using a thermoforming machine comprising a thermoforming device, a plastic foil providing station, a transport device, a central processing unit, at least one actuator disposed in communication with the central processing unit and with the thermoforming device. The thermoforming device comprises a first mold comprising a first mold body and a forming cavity arranged in the first mold body, and a second mold comprising a second mold body, a first pre-stretcher, and a calibration element, wherein the first pre-stretcher and the calibration element are at least partially and moveably arranged in the second mold body. According to the invention, the first and second mold can be moved relative to each other for clamping a plastic foil there between, and the calibration element is configured to locally clamp the plastic foil in between the calibration element and a wall and/or bottom of the forming cavity.

The invention is characterized in that the thermoforming device further comprises a second pre-stretcher that is at least partially and moveably arranged in the second mold body, and wherein a movement relative to the second mold body and towards the same forming cavity of at least one of the first pre-stretcher, the second pre-stretcher, and the calibration element, can be individually controlled, and wherein the second pre-stretcher at least partially surrounds the first pre-stretcher and the calibration element.

Preferably at least two, and more preferably each of the first pre-stretcher, the second pre-stretcher, and the calibration element can be individually controlled. In case one or more of the first pre-stretcher, the second pre-stretcher, and the calibration element cannot be individually controlled, the movement of that component or those components will depend on the movement of one or more of the controllable components. For instance, the controllable component may be driven by an actuator. When this component is driven, the movement thereof may cause the movement of another non-controllable component by means of a mechanical coupling.

The applicant has found that by using two or more individually controllable pre-stretchers in combination with a calibration element, it becomes possible to better control the wall thickness of the thermoformed product, in particular at positions where the calibration element engages the plastic foil. Control of wall thickness is further improved because the second pre-stretcher at least partially surrounds the first pre-stretcher and the calibration element. This allows proper control of the outer regions of the product.

In one embodiment of the thermoforming machine, the first pre-stretcher is configured to move relative to the second pre-stretcher or relative to the calibration element, and the calibration element is configured to move relative to the second pre-stretcher.

In another embodiment of the thermoforming device, the calibration element is configured to move relative to the second pre-stretcher or relative to the first pre-stretcher, and the first pre-stretcher is configured to move relative to the second pre-stretcher.

The first and second pre-stretchers are each configured to stretch the heated plastic foil that is clamped between the first and second molds in a direction towards a wall and/or bottom of the forming cavity.

The calibration element can be arranged at least partially around the first pre-stretcher. In an embodiment, the second pre-stretcher completely surrounds the calibration element, and the calibration element completely surrounds the first pre-stretcher. In this case, a bottom edge of the calibration element may have a ring shape, wherein other shapes are not excluded.

It should be noted that the second pre-stretcher need not fully surround the calibration element over the full length of the second pre-stretcher or calibration element. The same holds for the first pre-stretcher and the calibration element.

The second pre-stretcher and the calibration element may be essentially hollow structures, wherein the calibration element is at least partially arranged inside the second pre-stretcher, and wherein the first pre-stretcher is at least partially arranged inside the calibration element. In this case, the first pre-stretcher can be configured to move relative to the second pre-stretcher or relative to the calibration element, and the calibration element can be configured to move relative to the second pre-stretcher.

Alternatively, the second pre-stretcher and the first pre-stretcher can be essentially hollow structures, wherein the first pre-stretcher is at least partially arranged inside the second pre-stretcher, and wherein the calibration element is at least partially arranged in the first pre-stretcher. In this case, the calibration element can be configured to move relative to the second pre-stretcher or relative to the first pre-stretcher, and the first pre-stretcher can be configured to move relative to the second pre-stretcher.

The first and second pre-stretchers and the calibration element can be elongated in a direction perpendicular to the second and first mold bodies. The longitudinal axis of the first and second pre-stretchers and of the calibration element can be arranged in parallel. Additionally or alternatively, the first pre-stretcher, the second pre-stretcher, and the calibration element are coaxially arranged.

At least one of the first pre-stretcher, the second pre-stretcher, and the calibration element can be shaped as a sleeve, a jacket, or a bush, preferably having a square, rectangular, or circular cross section. Because the calibration element cooperates with a segment of the wall and/or bottom of the forming cavity, it is advantageous if the shape of the lower edge of the calibration element is complementary to the shape of the aforementioned segment. As an example, both the segment and the lower edge of the calibration element may be essentially flat.

The thermoforming device may further comprise a heating element configured for heating the calibration element relative to the second mold body. Heating the calibration element prevents early solidification of heated plastic foil when engaged by the calibration element. By controlling the amount of heating, the cooling down process of the plastic foil at the position of the calibration element can be controlled in correspondence of the cooling down process in other parts of the plastic foil.

In an embodiment, only a lower part of the calibration element is heated. This part can be thermally isolated from a remainder of the calibration element by a thermal isolator.

At least one of a stroke length, a stroke duration, a stroke speed, and a stroke starting time for the first pre-stretcher, the second pre-stretcher, and/or the calibration element can be individually controlled. Here, a stroke length can be defined as the maximum distance that the relevant component moves during the thermoforming process. Alternatively, the stroke length can be defined as the penetration depth of the relevant component in the forming cavity. The stroke duration can be defined as the time that the relevant component is held at its lowest position inside the forming cavity. The stroke speed can be defined as the maximum speed of the relevant component during the movement of the component towards the forming cavity or the time that is required for performing the stroke motion.

As the first pre-stretcher, the second pre-stretcher, and the calibration element can be controlled individually, for instance meaning that the movement of one component can be controlled separate from the controlling of the movement of another component, it is advantageous if the starting time of such motion can be set independently. This allows an order to be set for the thermoforming process. For example, it can be decided to first clamp the plastic foil using the calibration element and to then pre-stretch the foil. In this case, the calibration element also provides a stretching effect. Alternatively, it can be decided to first pre-stretch the plastic foil and to clamp the plastic foil using the calibration element only after the pre-stretching is partially or fully completed.

With respect to the calibration element, it is preferred if at least one of a starting time of clamping the plastic foil in between the calibration element and the wall and/or bottom of the forming cavity, a clamping duration, and a clamping strength, can be independently controlled. The clamping strength generally refers to the force exerted by the calibration element in a direction towards the relevant part of the wall and/or bottom of the forming cavity.

The thermoforming device may further comprise a forming air unit for generating an overpressure on a first side of the plastic foil that is clamped in between the first and second molds to urge the plastic foil to move towards the wall and/or bottom of the forming cavity. Here, the first side is directed away from the forming cavity.

An overpressure situation is generated when a higher pressure exists on the aforementioned side of the clamped plastic foil than on the other side of the plastic foil. For example, the second mold may comprise one or more second channels, wherein the forming air unit is configured to generate the overpressure by applying pressurized gaseous medium through the one or more second channels to the first side of the clamped plastic foil. Additionally or alternatively, the first mold may comprise one or more first channels, wherein the forming air unit is configured to generate the overpressure by evacuating a space in the forming cavity between the clamped plastic foil and the wall and/or bottom of the forming cavity through the one or more first channels.

The thermoforming device may be configured, for the purpose of forming a product out of the plastic foil clamped by the first and second molds, to generate the overpressure only after at least partially completing the stretching of the plastic foil using the first and second pre-stretchers. Additionally or alternatively, the thermoforming device may be configured, for the purpose of forming a product out of the clamped plastic foil, to cause the clamping of the plastic foil by the calibration element only after having started the application of the overpressure by the forming air unit.

The thermoforming device may comprise a first actuator for moving the first pre-stretcher relative to the second mold body, a second actuator for moving the second pre-stretcher relative to the second mold body, and/or a third actuator for moving the calibration element relative to the second mold body. The thermoforming device may further comprise a control system for controlling the first, second, and/or third actuator. As an example, the first actuator, the second actuator, and/or the third actuator may comprise a respective pneumatic or hydraulic cylinder, for moving the first pre-stretcher, the second pre-stretcher, and the calibration element, respectively. Alternatively, at least one of the first actuator, the second actuator, and the third actuator may comprise an electric motor for moving the first pre-stretcher, the second pre-stretcher, and the calibration element, respectively.

The first and second pre-stretcher may each comprise a respective plastic foil contacting part that is made of a different material than a remainder of the pre-stretcher. The plastic foil contacting part may for instance be made of a material having a relatively low thermal conductivity to prevent or limit the cooling of the plastic foil by the pre-stretchers. The respective plastic foil contacting part may be releaseably connected to the remainder of the pre-stretcher.

Similarly, the calibration element may comprise a plastic foil contacting part that is thermally isolated from a remainder of the calibration element. As stated before, the heating element may be configured to heat the plastic foil contacting part relative to said remainder of the calibration element. Moreover, the heating element may be controlled by the aforementioned control system.

The thermoforming device may comprise a mechanical stop that limits an outward stroke of at least one of the first pre-stretcher, the second pre-stretcher, and the calibration element. The mechanical stop can be formed by or can be coupled to the second mold body. The mechanical stop may define a stop position for the at least one of the first pre-stretcher, the second pre-stretcher, and the calibration element, wherein the stop position is adjustable by increasing or decreasing the effective thickness of the mechanical stop.

Generally, the first mold may comprise a plurality of forming cavities. In this case, the second mold may comprise, for each forming cavity, a respective first pre-stretcher, a respective second pre-stretcher, and a respective calibration element. The control system may be configured to control the first pre-stretchers, the second pre-stretchers, and the calibration element as a respective single unit. This can be achieved by simultaneously controlling the actuators of such unit such that, for example, every first pre-stretcher performs the same motion.

In other embodiments, a single first, second, or third actuator may be used to actuate several first pre-stretchers, second pre-stretchers, or calibration elements, respectively.

According to a second aspect, the present invention provides a mold assembly for thermoforming a product comprising the first and second mold as defined above.

According to a third aspect, the present invention provides a mold for thermoforming a product comprising the second mold as defined above.

According to a fourth aspect, the present invention provides a method for thermoforming a product using the thermoforming device as described above, comprising the steps of:
 clamping a heated plastic foil in between the first and second mold;
 individually stretching the plastic foil in a direction towards a wall and/or bottom of a forming cavity in the first mold using the first and second pre-stretcher;
 generating an overpressure on a side of the clamped plastic foil directed away from the forming cavity to urge the plastic foil to move towards the wall and/or bottom of the forming cavity; and
 locally clamping the heated plastic foil between the calibration element and a wall and/or bottom of the forming cavity after having started the application of the overpressure.

The method preferably further comprises the step of allowing the shaped plastic foil to cool down while keeping it locally clamped using the calibration element.

DETAILED DESCRIPTION

The present invention is described below in more detail referring to the appended drawings.

Figure 1:
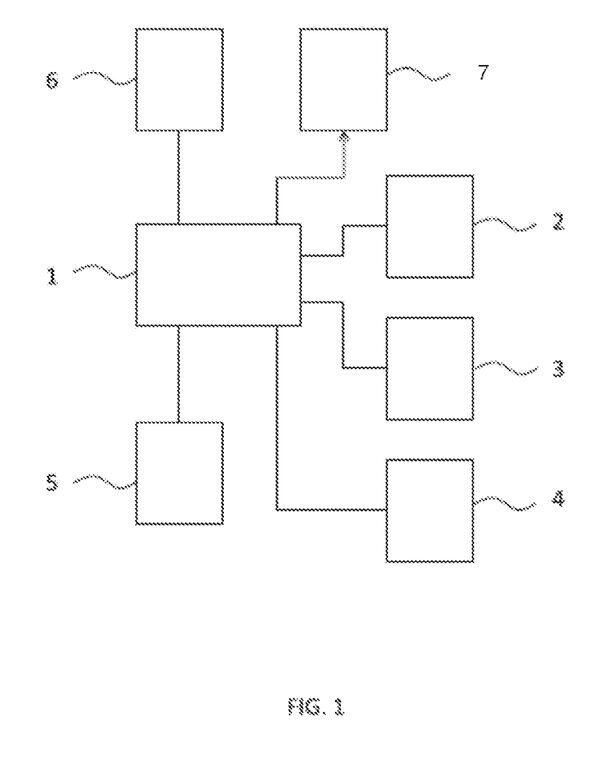
FIG. 1 schematically illustrates an embodiment of the present invention.

FIG. 1 illustrates an embodiment of the present invention. This embodiment comprises a control system 1 that is configured to control a first actuator 2, a second actuator 3, a third actuator 4, and a mold actuator 5, which actuators are configured to actuate the first pre-stretcher, the second pre-stretcher, the calibration element, and the first and/or second mold, respectively. Control system 1 can further be configured to control heating element 7 in dependence of a temperature sensed by temperature sensor 6.

In one mode of operation, control system 1 may control mold actuator 5 to cause the first mold and the second mold to move relative to each other for the purpose of clamping a heated plastic foil there between. Next, control system 1 may control second actuator 3 to cause the second pre-stretcher to move downward towards to the forming cavity, thereby performing a primary stretching of the plastic foil. Depending on the configuration of the calibration element and the first pre-stretcher, the calibration element and the first pre-stretcher may remain stationary with respect to the second pre-stretcher during the motion of the latter.

As a next step, control system 1 may control first actuator 2 to cause the first pre-stretcher to move downward towards to the forming cavity, thereby performing a secondary stretching of the plastic foil. Here, the secondary stretching may be performed simultaneous with or after the primary stretching.

Once the primary and secondary stretching are completed, or substantially completed, control system 1 may control third actuator 4 to cause the calibration element to move downward towards to the forming cavity for the purpose of locally clamping the pre-stretched plastic foil against a wall and/or bottom of the forming cavity. During and/or before this clamping, the temperature of the calibration element may be controlled using heating element 7 that is controlled by control system 1 preferably in dependence of a temperature sensed by temperature sensor 6.

It is noted that the present invention is not limited to the order of the steps mentioned above.

Figure 2:
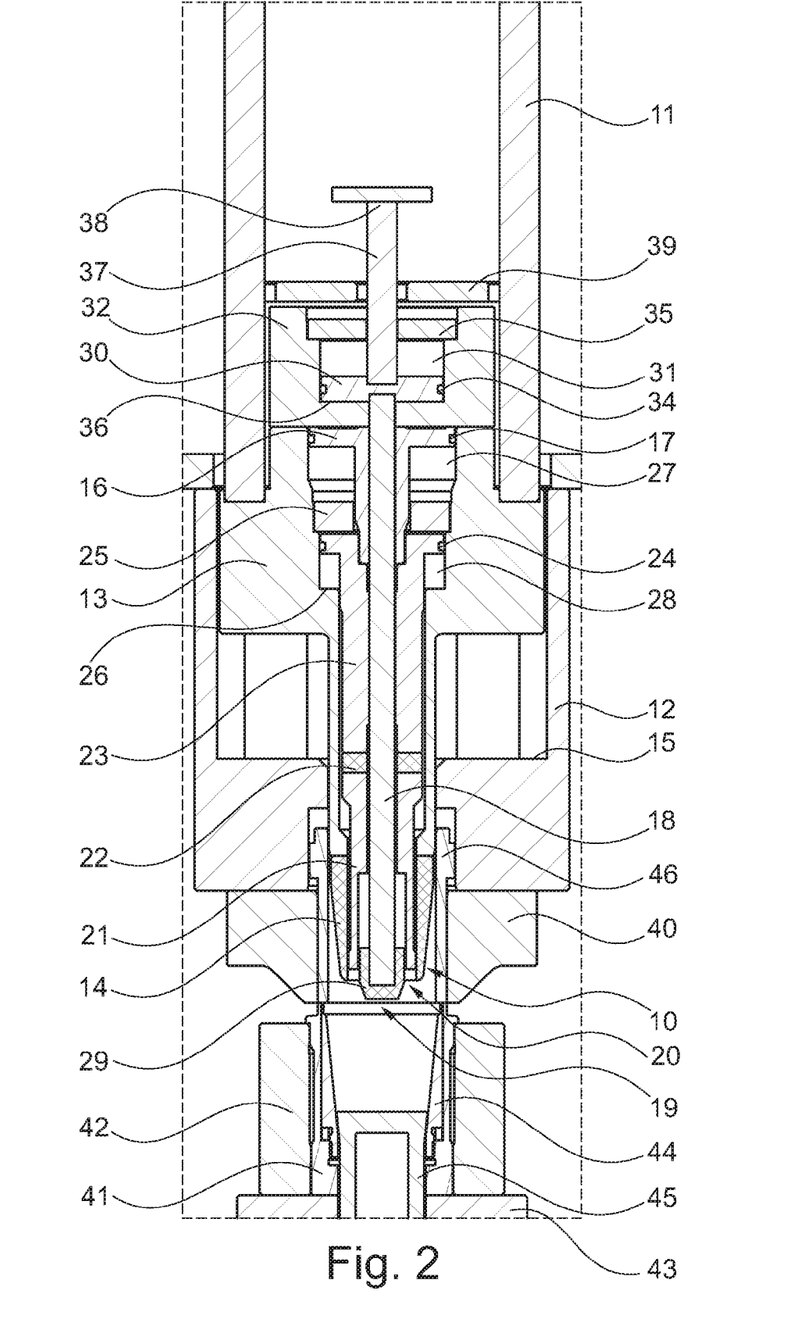
FIG. 2 illustrates a cross section of a mold assembly according to the present invention.
Figure 3A:
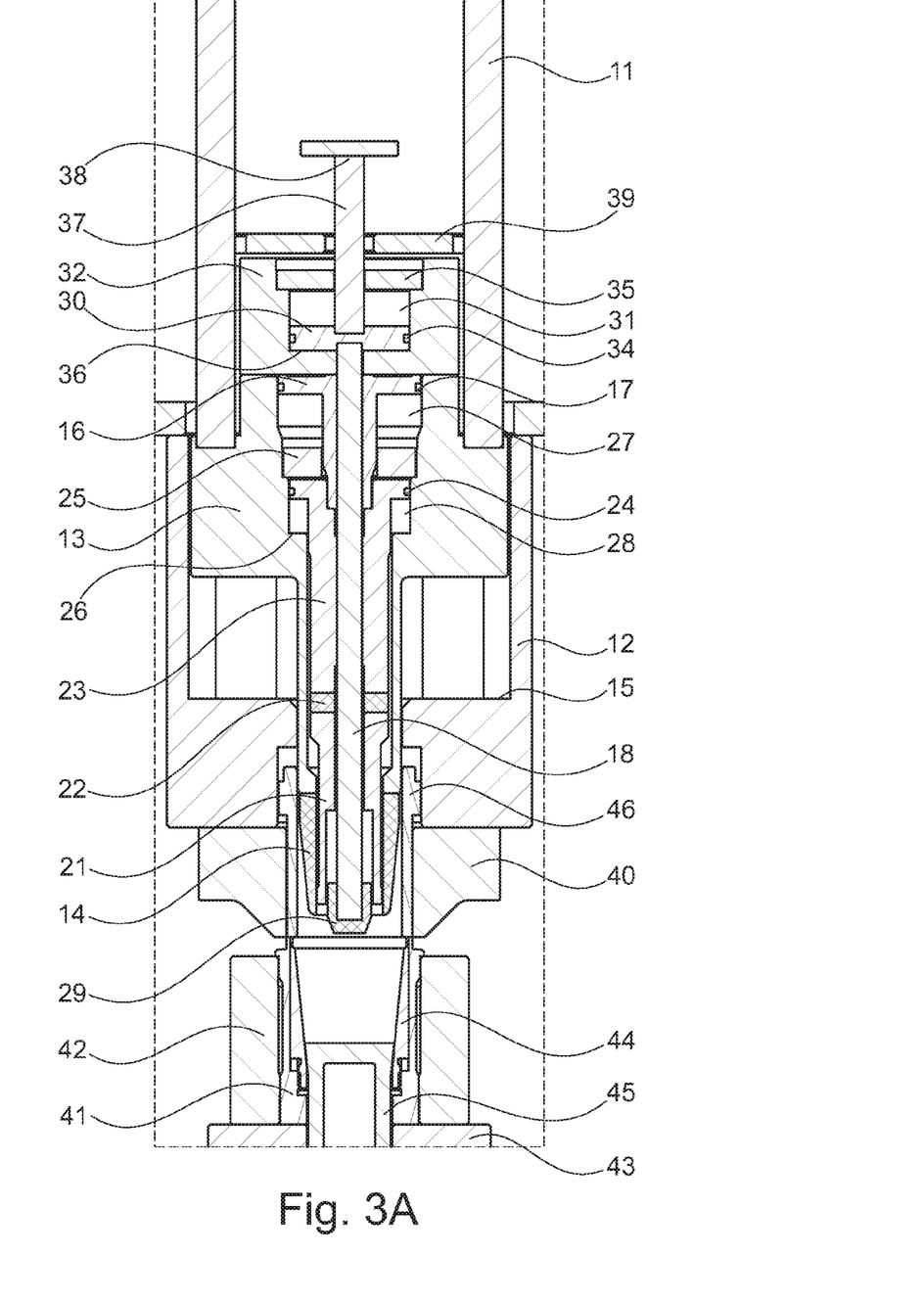
FIGS. 3A and 3B present different detailed views of the assembly of FIG. 2.
Figure 3B:
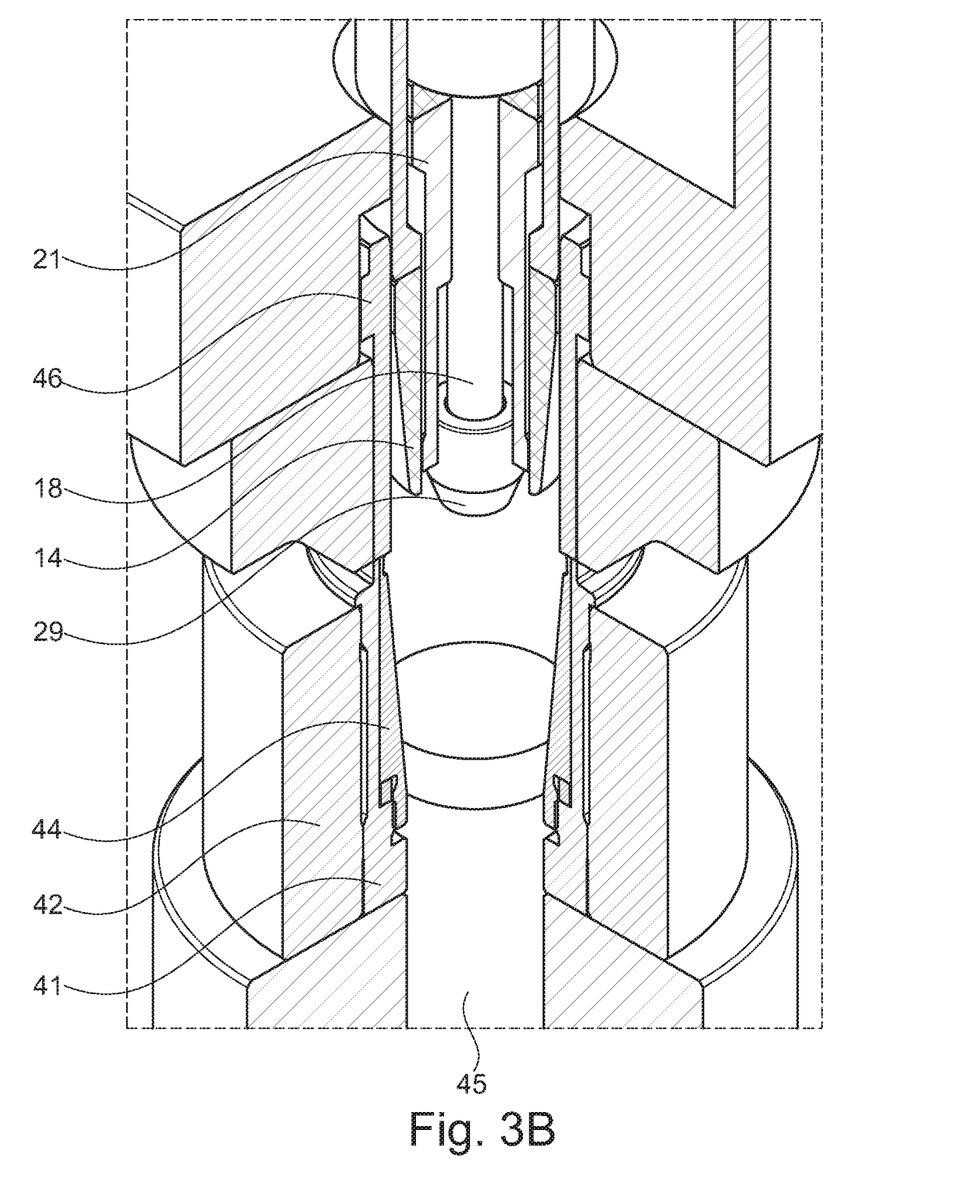

FIG. 2 illustrates a cross section of an embodiment of a mold assembly according to the invention. FIGS. 3A and 3B present detailed views of this assembly.

Now referring to FIG. 2, second pre-stretcher 10 is coupled to a mechanical drive. This drive comprises an at least partially hollow pen 11 that is capable of moving up and down relative to second mold body 12. Second pre-stretcher 10 comprises a first part 13 and a foil engaging part 14, wherein foil engaging part 14 can be fixedly or releasably connected to first part 13.

Second mold body 12 defines a mechanical stop 15 that defines a maximum position of second pre-stretcher 10, although the mechanical drive may be configured such that second pre-stretcher 10 stops its downward movement before it engages mechanical stop 15.

First part 13 of second pre-stretcher 10 comprises a bore in which on the top side thereof a guiding element 16, in the form of a piston, is arranged, which guiding element 16 is provided with a sealing ring 17. Guiding element 16 is provided with a through hole in which a rod 18 corresponding to first pre-stretcher 19 is moveably arranged.

Calibration element 20 is moveably arranged inside the bore of second pre-stretcher 10. Calibration element 20 comprises a foil engaging part 21 which is thermally isolated, using a thermal isolator 22, from a second part 23. Here, parts 21 and 23 are fixedly connected to each other via isolator 22. At a top side, second part 23 is provided with a sealing ring 24. Moreover, second part 23 is fixedly arranged with respect to guiding element 16.

Second part 23 is able to move up and down in the space defined by an inside wall of first part 13. A mechanical stop 25 is fixedly arranged with respect to first part 13 to limit the upward motion of second part 23 and a further mechanical stop 26 is formed by first part 13.

First pre-stretcher 19 comprises a foil engaging part 29, rod 18, and a cylinder 30 that is moveably arranged inside a chamber 31 inside a part 32 that is fixedly coupled to first part 13. Cylinder 30 comprises a sealing ring 34. Part 32 is fixedly connected to a mechanical stop 35 that provided a first limit to the upward motion of first pre-stretcher 19. Similarly, a mechanical stop 36 is formed by part 32. Moreover, cylinder 30 is connected to a rod 37 that is provided with a T-like element 38 at its top. Here, rod 37 is guided through an opening in mechanical stop 39, which stop 39 is attached stationary relative to second mold body 12. Hence, the downward motion of pre-stretcher 19 is limited due to cylinder 30 engaging stop 36 or due to T-like element 38 engaging stop 39.

At a bottom side, second mold body 12 is provided with a cutting plate 40 that is configured to cooperate with a cutting nipple 41 that is arranged in a top plate 42 of first mold body 43.

Inside cutting nipple 41, a forming cavity is formed using a forming jacket 44 and a forming bottom 45.

The space defined by the inside wall of first part 13 is divided in two chambers 27, 28. To move second part 23 downward, pressurized air can be applied in between guiding element 16 and part 32. At the same time, pressurized air can be applied in between second part 23 and mechanical stop 25. To enable a downward motion of second part 23, chambers 27, 28 are vented through conduits (not shown)

To move second part 23 upward, pressurized air is applied to chamber 27 in between mechanical stop 25 and guiding element 16. At the same time, the space in between guiding element 16 and part 32 is vented, preferably using the conduits (not shown) through which the pressurized gas was transported for the downward motion. The same holds for the space in between second part 23 and mechanical stop 25, and chamber 28.

FIG. 2 illustrates a situation wherein first pre-stretcher 19 is at its most downward position relative to second pre-stretcher 10 and wherein calibration element 20 is at its most upward position relative to second pre-stretcher 10.

Although the present invention is not limited to a particular order of controlling pre-stretchers 10, 19 and calibration element 20, an exemplary mode of operation will be described next.

As a starting position, first pre-stretcher 19 will be in its most upward position, in which cylinder 30 lies against stop 35. Moreover, calibration element 20 will also be in its most upward position, in which the top of part 23 lies against stop 25. Moreover, second pre-stretcher 10 will be in its most upward position.

As a first step, first and second molds will be brought together for clamping a plastic foil in between them. More in particular, a plastic foil will be clamped in between a down-holding element 46, which is received in a bore of cutting plate 40, and cutting nipple 41.

As a second step, the mechanical drive will be actuated for moving pen 11 downward. This will cause foil engaging part 14 of second pre-stretcher 10 to engage the clamped plastic foil, thereby pre-stretching the latter. During this primary pre-stretching, first pre-stretcher 19 and calibration element 20 do not move relative to second pre-stretcher 10.

As a next step, pressurized air will be supplied to chamber 31 via channels (not shown) to press cylinder 30 downward, thereby causing a secondary pre-stretching to occur as foil engaging part 29 engages the clamped plastic foil. During this motion, calibration element 20 does not move relative to second pre-stretcher 10.

Next, pressurized forming air will be supplied from inside the second mold to engage the plastic foil from an upper side thereof. This will cause the plastic foil to be pressed against the inside walls of forming jacket 44 and forming bottom 45.

As a next step, pressurized air will be supplied to cause a downward motion of second part 23 as described above, thereby causing a local clamping of the pre-stretched plastic foil in between foil engaging part 21 and forming bottom 45.

The shaped product will now be allowed to cool down, preferably while keeping it clamped using calibration element 20.

As a next step, the forming air will be vented and pressurized air will be supplied to chamber 27 to move calibration element 20 back to its initial position relative to second pre-stretcher 10. Additionally, pressurized air will be supplied to chamber 36 on another side of cylinder 30 to move first pre-stretcher 19 upward to its initial position relative to second pre-stretcher 10. In addition, second pre-stretcher 10 will be moved upward by driving pen 11.

In this embodiment, calibration element 20 is moved using a double-acting configuration, wherein pressurized air is supplied to move calibration element 20 up and down. Alternatively, a single-acting configuration can be used wherein calibration element 20 is pre-biased to move in a given direction, and wherein pressurized air can be used to cause calibration element 20 to move in the other direction.

The first and second molds may make a slight movement towards each other such that cutting plate 46 and cutting nipple 41 may pass each other thereby cutting through the plastic foil in between them. In this manner, the formed product can be separated from the remainder of the plastic foil.

Next, the second and first molds may move away from each other. As a last step, the forming bottom 45 can be moved upward for pushing out the formed product.

It should be noted that a mold assembly may comprise a plurality of forming cavities as illustrated in FIG. 2. For each cavity, a first pre-stretcher 19, a calibration element 20, and a second pre-stretcher 10 can be arranged.

Although the present invention has been described using a detailed embodiment thereof, the skilled person readily understands that the present invention is not limited thereto but that various modifications can be made without departing from the scope of the invention which is defined by the appended claims.

For example, the order of movement of the first and second pre-stretchers, and of the calibration element, can be varied as well as the moment in time when the forming air is applied. The forming air may for instance be applied only after the calibration element has started to clamp the plastic foil. By using the mold assembly of the present invention a great variety of thermoforming processes can therefore be realized.

Figure 4:
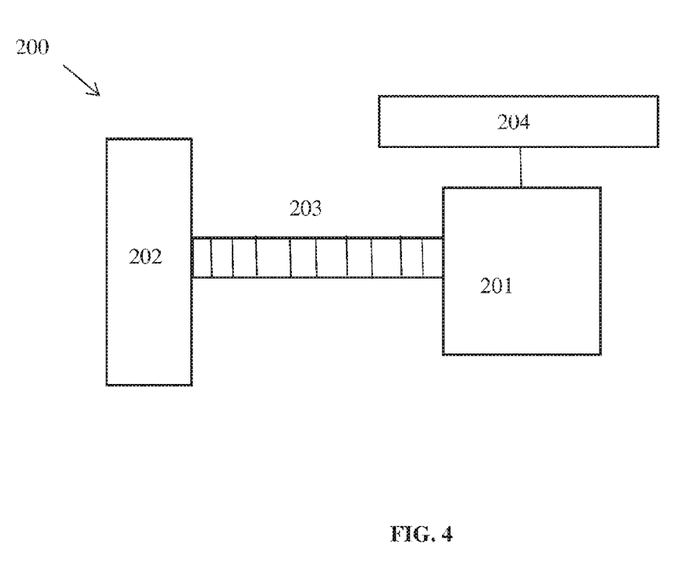
FIG. 4 schematically illustrates an embodiment of the thermoforming machine.

FIG. 4 schematically illustrates an exemplary embodiment of a thermoforming machine 200. As shown in FIG. 4, the thermoforming machine 200 comprises a thermoforming device 201, a plastic foil providing station 202, a transport device 203, and a central processing unit 204. The plastic foil providing station 202 could be any suitable storage or distribution device that is configured to operate with the transport device 203 to deliver the plastic foil from the station to the transforming device 201. In one embodiment, the plastic foil providing station 202 is a storage rack and the transport device 203 is a conveyer belt. The transport device 203, more generally, is any suitable mechanism or arrangement which is configured to deliver the plastic foil to the thermoforming device 201. As mentioned, the transport device 203 may comprise a conveyor belt arrangement. In other embodiments, the transport device 203 may comprise a vehicle, a transfer arm, and/or a robotic apparatus.

Figure 5:
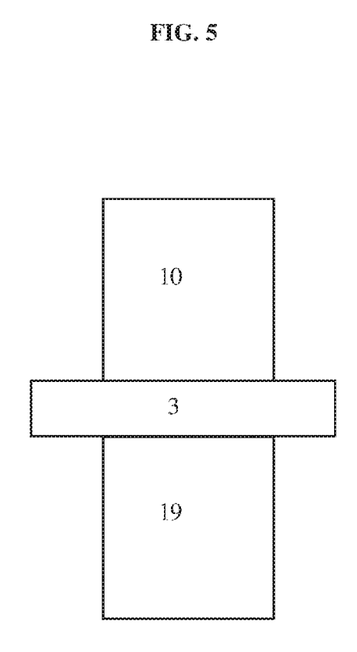
FIG. 5 shows a schematic representation of an enlarged partial view of FIG. 2.

FIG. 5 shows a schematic representation of an enlarged partial view of FIG. 2. Therein, the second actuator 3, which is configured to move the second pre-stretcher 10, is mounted on the first pre-stretcher 19 such that the actuator 3 is arranged to move the second pre-stretcher 10 by making a relative stroke versus the first pre-stretcher 19. That is, the second actuator 3 bears against the first pre-stretcher 19 in order to move the second pre-stretcher 10.

The invention claimed is:

1. A thermoforming machine, comprising:
   a thermoforming device;
   a plastic foil providing station;
   a transport device configured for delivering the plastic foil from the station to the thermoforming device;
   a central processing unit;
   at least one actuator disposed in communication with the central processing unit and with the thermoforming device;
   wherein the thermoforming device comprises:
      a first mold comprising a first mold body and a forming cavity arranged in said first mold body;
      a second mold comprising a second mold body,
      a calibration element,
      a first pre-stretcher, and
      a second pre-stretcher moveably disposed in the second mold body;
   wherein the first pre-stretcher and the calibration element are moveably arranged at least partially within the second mold body;
   wherein the at least one actuator is configured to move the first pre-stretcher and the calibration element in the second mold body;
   wherein the central processing unit and the at least one actuator are configured to move the first and second mold relative to each other in order to clamp the plastic foil there between;
   wherein the calibration element is configured to locally clamp the plastic foil in between the calibration element and a wall of the forming cavity;
   wherein the central processing unit and the at least one actuator are configured to move the calibration element to said locally clamped plastic foil;
   wherein the central processing unit is configured to individually control a movement of at least one of the first pre-stretcher, the second pre-stretcher, and the calibration element relative to the second mold body and toward the forming cavity;
   wherein the at least one actuator is configured to move the second pre-stretcher and is mounted on the first pre-stretcher such that the actuator is configured to move the second pre-stretcher by making a relative stroke versus the first pre-stretcher, and
   wherein the second pre-stretcher at least partially surrounds the first pre-stretcher and the calibration element.

2. The thermoforming machine according to claim 1, wherein at least two of the first pre-stretcher, the second pre-stretcher, and the calibration element are configured to be individually controlled.

3. The thermoforming machine according to claim 1, wherein each of the first pre-stretcher, the second pre-stretcher, and the calibration element are configured to be individually controlled.

4. The thermoforming machine according to claim 1, wherein the calibration element at least partially surrounds the first pre-stretcher.

5. The thermoforming machine according to claim 4, wherein the second pre-stretcher and the calibration element are essentially hollow structures, wherein the calibration element is at least partially arranged inside the second pre-stretcher, and wherein the first pre-stretcher is at least partially arranged inside the calibration element.

6. The thermoforming machine according to claim 1, wherein the second pre-stretcher and the first pre-stretcher are essentially hollow structures, wherein the first pre-stretcher is at least partially arranged inside the second pre-stretcher, and wherein the calibration element is at least partially arranged inside the first pre-stretcher.

7. The thermoforming machine according to claim 5, wherein the first pre-stretcher, the second pre-stretcher, and the calibration element are coaxially arranged.

8. The thermoforming machine according to claim 1, wherein at least one of the first pre-stretcher, the second pre-stretcher, and the calibration element is shaped as a sleeve, a jacket, or a bush, having a square, rectangular, or circular cross section.

9. The thermoforming machine according to claim 1, further comprising a heating element configured for heating the calibration element relative to the second mold body.

10. The thermoforming machine according to claim 1, further comprising a forming air unit for generating an overpressure on a first side of the plastic foil that is clamped in between the first and second molds to urge the plastic foil to move towards the wall and/or bottom of the forming cavity, said first side being directed away from the forming cavity.

11. The thermoforming machine according to claim 1, wherein the second mold comprises one or more second channels, and wherein the forming air unit is configured to generate said overpressure by applying pressurized gaseous medium through the one or more second channels to said first side of the clamped plastic foil.

12. The thermoforming machine according to claim 1, wherein the first mold comprises one or more first channels, and wherein the forming air unit is configured to generate said overpressure by evacuating a space in the forming cavity between the clamped plastic foil and the wall and/or bottom of the forming cavity through the one or more first channels.

13. The thermoforming machine according to claim 1, wherein the thermoforming device is configured, for the purpose of forming a product out of the plastic foil clamped by the first and second molds, to generate said overpressure only after at least partially completing the stretching of the plastic foil using the first and second pre-stretchers.

14. The thermoforming machine according to claim 1, wherein the thermoforming device is configured, for the purpose of forming a product out of the clamped plastic foil, to cause the clamping of the plastic foil by the calibration element only after having started the application of the overpressure by the forming air unit.

15. The thermoforming machine according to claim 1, wherein the at least one actuator comprises:
 a first actuator for moving the first pre-stretcher relative to the second mold body,
 a second actuator for moving the second pre-stretcher relative to the second mold body, and/or
 a third actuator for moving the calibration element relative to the second mold body, and wherein the central processing unit is configured for controlling the first, second, and/or third actuator.

16. The thermoforming machine according to claim 1, wherein the first and second pre-stretcher each comprise a respective plastic foil contacting part that is made of a different material than a remainder of the pre-stretcher.

17. The thermoforming machine according to claim 16, wherein the respective plastic foil contacting part is releaseably connected to the remainder of the pre-stretcher.

18. The thermoforming machine according to claim 11, wherein the heating element is configured to heat the plastic foil contacting part relative to said remainder of the calibration element.

19. The thermoforming machine according to claim 1, wherein an outward stroke of at least one of the first pre-stretcher, the second pre-stretcher, and the calibration element is limited by a mechanical stop that is formed by or is coupled to the second mold body.

* * * * *